United States Patent Office 3,577,482
Patented May 4, 1971

3,577,482
PROCESS FOR THE PREPARATION OF
THIONOPHOSPHONATES
Delbert L. Hanna, Oak Park, Ill., assignor to Velsicol
Chemical Corporation, Chicago, Ill.
No Drawing. Filed May 31, 1968, Ser. No. 733,331
Int. Cl. C07f 9/40
U.S. Cl. 260—973                                    5 Claims

ABSTRACT OF THE DISCLOSURE

A process for preparing an O-alkyl-O-phenyl phenyl-thionophosphonate which comprises
(a) reacting a phenylthionophosphonoyl dihalide with an alkanol in the presence of trimethylamine and,
(b) reacting the resulting intermediate reaction mixture with a phenol in the presence of trimethylamine, and thereafter recovering the desired product.

---

This invention relates to a process for preparing thionophosphonates and more particularly to O-alkyl-O-phenyl phenylthionophosphonates.

O-alkyl-O-phenylthionophosphonates are valuable industrial chemical compounds and many of these compounds have important pesticidal properties. In general, these compounds have been prepared in a two reaction step synthesis from a phenylthionophosphonoyl dihalide starting material involving a multiplicity of operations. In the first, or alcoholysis, step of the synthesis an O-alkylphenylthionophosphonoyl halide intermediate is prepared by reacting the phenylthionophosphonoyl dihalide starting material with an alcohol in the presence of a solvent and an acid acceptor. This reaction is followed by isolation and purification of the product which usually involves removal by filtration of the solid acid salts formed by the combination of the liberated hydrogen halide and acid acceptor, and removal of the solvent by fractional distillation. The pure O-alkylphenylthionophosphonoyl halide thus prepared is then reacted in the second or coupling step of the synthesis with a phenol in the presence of an acid acceptor and a solvent to form the desired product. The product is then ordinarily recovered by a series of purification steps involving removal of the salt formed by the combination of the hydrogen halide and the acid acceptor by filtration or extraction with water, and removal of the solvent by evaporation or fractional distillation.

This preparational synthesis is not particularly desirable, however. Aside from the expense of conducting the preparation using the multiplicity of operations involved in the two process steps, each of the individual reactions suffers from certain disadvantages which adversely affect the economic and satisfactory preparation of these valuable compounds. In the first, or alcoholysis, step, due to the highly hazardous nature of the O-alkylphenyl-thionophosphonoyl halide intermediate, very careful controls and procedures must be employed to avoid serious health hazards. This is an especially serious limitation because of the several processing procedures required to isolate and purify the intermediate for the next reaction step of the synthesis. The second, or coupling, step of the synthesis also suffers from disadvantages associated with the hazardous nature of the intermediate. In addition to the initial problem of handling the hazardous intermediate, the elevated temperatures, ranging up to reflux, and the lengthy reaction periods required in effecting the reaction to obtain satisfactory product yields provide a hazardous processing operation, particularly when conducted on an industrial scale.

Accordingly, an object of this invention is to provide a process for preparing O-alkyl-O-phenyl phenylthionophosphonates which avoids the problems heretofore encountered. Another object is to provide a process which avoids the isolation and purification of the O-alkyl phenyl-thionophosphonoyl halide intermediate as well as the necessity for employing elevated temperatures in effecting the coupling reaction of such intermediate with a phenol. A further object is to provide a process for preparing these compounds in high yield and moreover in a particularly convenient and safe industrial manner.

Other objects of this invention will be apparent from the following further detailed description thereof.

The above objects are realized according to this invention by effecting both the reaction of the phenyl-thionophosphonoyl dihalide and the alcohol as well as the reaction of the O-alkyl phenylthionophosphonoyl halide intermediate and the phenol in a process which avoids the necessity of isolating and purifying the O-alkyl phenyl-thionophosphonoyl halide intermediate, and further avoids the tedious necessity of removing the tertiary amine hydrochloride from the reaction medium during this reaction process. Moreover, employment of this reaction process permits the utilization of safe and particularly convenient low temperatures and relatively short reaction periods for the second, or coupling, reaction of the preparation. This preparation of O-alkyl-O-phenyl phenyl-thionophosphonates is achieved according to this invention by the combination of utilizing certain reactants in the preparation and employing certain procedures to conduct the reactions. Basically, the porcess is effected according to this invention by reacting the phenyl thionophosphonoyl dihalide with an alkanol in the presence of an aromatic hydrocarbon solvent and trimethylamine to form the O-alkyl phenylthionophosphonoyl halide intermediate and reacting the intermediate thus formed without isolation or purification with a phenol in the presence of the solvent and the trimethylamine.

The preparation of O-alkyl-O-phenyl phenylthionophosphonates in accordance with the process of this invention can be represented by the following general equations A and B illustrating, respectively, the alcoholysis and coupline reactions of the process:

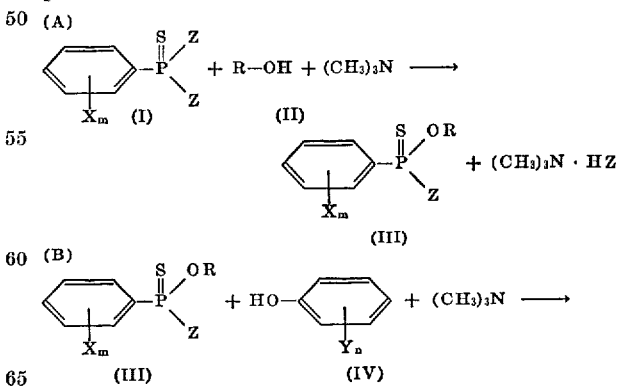

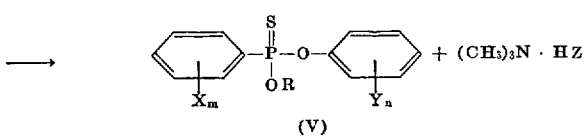

(V)

wherein X is selected from the group consisting of alkyl, alkoxy, alkylmercapto, halogen and nitro, m is an integer of from 0 to about 5, Z is halogen, such as chlorine or bromine, R is alkyl of from 1 to about 5 carbon atoms, Y is a halogen, and n is an integer of from 1 to about 5.

In the above equations, Formula I represents the phenylthionophosphonoyl dihalides which can be employed as the starting material in the process of this invention. Typical phenyl thionophosphonoyl dihalides include:

phenylthionophosphonoyl dichloride,
phenylthionophosphonoyl dibromide,
4-chlorophenylthionophosphonoyl dichloride,
4-methylphenylthionophosphonoyl dichloride,
3-methylmercaptophenylthionophosphonoyl dichloride, or
4-nitrophenylthionophosphonoyl dichloride.

Formula II in the above equations represents the alcohols which can be employed to effect the alcoholysis of the phenyl thionophosphonoyl dihalides I to produce the O-alkylphenylthionophosphonoyl halide intermediate represented by Formula III. Illustrative alcohols include alkanols containing from one to above five carbon atoms in the alkyl group such as methyl-, ethyl-, propyl-, butyl-, or pentyl alcohols, as well as any isomeric forms thereof. The intermediate III is not isolated from the reaction mixture but is directly reacted according to this invention with the phenol represented by Formula IV. However, examples of the compounds represented by Formula III obtained by reacting the phenylthionophosphonoyl dihalides I with the alcohols II include:

O-methylphenylthionophosphonoyl chloride,
O-ethylphenylthionophosphonoyl bromide, or
O-methyl 4-chlorophenylthionophosphonoyl chloride.

Illustrative phenols represented by Formula IV which can be reacted in phase B with the intermediate III include:

4-chlorophenol,
2,4,6-trichlorophenol,
4-bromophenol,
2-chloro-4-bromophenol, or
4-bromo-2,3-dichlorophenol.

The desired O-alkyl-O-phenyl phenylthionophosphonate products of the process of this invention are represented in the above equations by Formula V and typical illustrative examples include:

O-methyl-O-phenyl phenylthionophosphonate,
O-ethyl-O-4-chlorophenyl 4-methylphenylthionophosphonate,
O-propyl-O-2,4,6-trichlorophenyl phenylthiononophosphonate,
O-methyl-O-4-bromophenyl 4-methoxyphenylthionophosphonate,
O-propyl-O-2-bromophenyl 4-methylmercaptophenylthionophosphonate, or
O-ethyl-O-4-bromo-2,5-dichlorophenyl phenylthionophosphonate.

Of the various thionophosphonates, however, which can be prepared in the process of this invention, particularly desirable results in respect to high yields and convenience of preparation are achieved when preparing thionophosphonates where the Y in the above Formula V is halogen such as chlorine or bromine or mixtures thereof and wherein the integer n is 3. These compounds, accordingly, are the preferred products of the process and an illustrative member of this class is O-methyl-O-4-bromo - 2,5 - dichlorophenyl phenylthionophosphonate which is prepared from the initial phenylthionophosphonoyl dihalide by reaction with methanol and 4-bromo-2,5-dichlorophenol as the preferred reactants in the above Formulas II and IV, respectively.

In carrying out the process of this invention, the phenylthionophosphonoyl dihalide I is reacted according to Equation A above with the alcohol II in the presence of a solvent and trimethylamine as the acid or hydrogen halide acceptor to prepare the O-alkylphenylthionophosphonoyl halide intermediate III. This intermediate, without isolation or purification, is then directly reacted according to Equation B above with the phenol IV in the presence of the solvent and the trimethylamine to form he desired product V. The utilization of trimethylamine as the acid acceptor employed in the two reactions is an important feature of the process of this invention. Its utilization, in combination with the mode of conducting the two reactions, eliminates the necessity for several operations otherwise required in carrying out the two reaction steps. Moreover, the successful utilization of the trimethylamine in achieving this objective is quite surprising. Usually, the hydrogen halide salt formed as a result of the interaction of the acid acceptor and the halogen liberated from the phenylthionophosphonoyl dihalide limits or interferes with the reactivity of the O-alkylphenylthionophosphonoyl halide intermediate and must be removed prior to its reaction with the phenol according to Equation B above if acceptable product yields are to be achieved.

The conditions and procedures used in conducting the process of this invention are important to its success, especially in achieving a combination of two reactions in such a way as to avoid isolation or purification of the hazardous intermediate product. Moreover, as indicated, the process of this invention, especially the coupling phase, can be effected at a highly convenient, low temperature and within a short reaction period. This avoids the necessity of using the undesirable elevated temperatures and long reaction periods heretofore employed to achieve acceptable product yields. While the same temperature can be employed in conducting both the alcoholysis phase and the coupling phase of the process, it generally is desirable to use a slightly different temperature range for each of the reaction phases. The particular temperature employed in either reaction phase can be varied with the particular optimum temperature utilized being primarily dependent upon the specific reactants and the solvent. In general, the alcoholysis phase can be conducted at a temperature of from about −20° C. to about 35° C., with a range of from about −15° C. to about 5° C. usually being preferred. The coupling phase is preferably conducted at a slightly elevated temperature and it usually ranges from about 0° C. to about 35° C., with a range of from about 15° C. to about 30° C. being advantageously employed for most reactions. The quantity of the reactants employed can be varied but generally substantially stoichiometric quantities are preferred or about one mol each of the phenylthionophosphonoyl dihalide, the alcohol and the phenol. Substantially stoichiometric quantities of the trimethylamine are also preferred and consist of about one mol of trimethylamine per one mol of the phenylthionophosphonoyl dihalide in the alcoholysis phase and about one mol per one mol of the O-alkylphenylthionophosphonoyl halide in the coupling reaction. In this latter reaction phase, the mols of the unisolated intermediate product can be calculated upon the assumption that substantially all of the initial phenylthionophosphonoyl dihalide has been reacted in the alcoholysis reaction.

As indicated, the procedures employed in conducting the alcoholysis and coupling reactions of the preparation are important to the success of the process of this invention. While different procedures can be utilized, the desired results in respect to the obtainment of high yield and convenience of operation are maximized when conducting the reactions of the process according to the following preferred operating procedures. In the first reaction of the process, the alcoholysis reaction, the phenylthionophosphonoyl dihalide and the alcohol are reacted by adding the alcohol to the phenylthionophosphonoyl dihalide. This is preferably achieved by gradually adding a mixture of the alcohol and the trimethylamine to the dihalide contained in the solvent while maintaining the temperature of the exothermic reaction within the aforesaid temperature ranges. The rate of the addition is adjusted so that substantially all of the alcohol reacts as it is added with the reaction advantageously being complete at the end of the addition. This addition period is usually short and typically ranges from about 0.5 to about 3 hours. The coupling phase of the process is then conducted by adding the phenol and an appropriate additional quantity of the trimethylamine to the O-methyl-phenylthionophosphonoyl halide intermediate contained in the reaction mixture while maintining the desired temperature range. Advantageously, all of the phenol is first added, followed by the gradual addition of the amine. Unlike previous coupling reactions conducted independently of the alcoholysis reaction, the period of time required for the coupling reaction is very short and the reaction is usually complete upon the addition of the phenol and the amine. To insure completion of the reaction, however, the reaction mixture is preferably maintained at the desired temperature range for a short additional period ranging up to one or two hours. When the reaction is complete, the desired product can be recovered from the reaction mixture and purified according to conventional techniques such as acidification and washing to remove the trimethylamine salts as precipitates, decantation of the organic product phase, and distillation to separate the solvent from the desired product.

A large variety of different solvents or combination of solvents can be employed in effecting both the alcoholysis and coupling reactions in the process of this invention with the principal limitations being that the solvent is inert to the reactants and is capable of substantially solubilizing the reactants at the reaction conditions employed. Typically, aromatic hydrocarbon solvents such as benzene or alkyl benzenes such as toluene, xylene, or ethyl benzene can be suitably employed with toluene being particularly satisfactory in most instances. The quantity of solvent employed can be varied with the amount being a function of the particular solvent or combination and the reactants employed.

The following examples are offered to illustrate the process of this invention. They are not intended, however, to limit the invention to the particular reactants, conditions or processing procedures illustrated therein.

EXAMPLE 1

A phenylthionophosphonate was prepared by the process of this invention according to the following procedure:

Phenylthionophosphonoyl dichloride (211 grams; 1.0 mol), and toluene (500 cc.) were charged into a glass reaction flask equipped with stirring and cooling means. With the temperature at about −10° C. to about 0° C., a mixture of methyl alcohol (32 grams; 1.0 mol), trimethylamine (59 grams), and toluene (300 cc.) were added with stirring over a period of about one hour. 4-bromo-2,5-dichlorophenol (242 grams; 1.0 mol), contained in 500 cc. of toluene was added, followed by the addition of trimethylamine (59 grams; 1.0 mol) over about 1.25 hours with the temperature maintained at about 19° to 20° C. While maintaining such temperature, the stirring was continued for about 1½ hours. After this time the reaction mixture was first treated with 10% aqueous sulfuric acid to remove the trimethylamine hydrochloride salt and was then washed in succession with water, a sodium carbonate solution, and finally again with water. The washed organic toluene phase was then stripped under vacuum leaving the desired O-methyl-O-4-bromo-2,5-dichlorophenyl phenylthionophosphonate product.

A further illustration of the process of this invention is given in the following example wherein a phenylthionophosphonate was prepared on a large scale.

EXAMPLE 2

Phenylthionophosphonoyl dichloride (422 lbs.) and toluene (165 gallons) were charged into a 300 gallon glass-lined reactor equipped with stirring and cooling means. The mixture was stirred and cooled to about 5° F. and a mixture of methanol (64 lbs.), trimethylamine (118 lbs.) and toluene (75 gallons), which was first cooled to 50° F., was then slowly added at such a rate as to keep the reaction temperature between 28° F. and 36° F. After the addition was completed a sample of the reaction mixture was analyzed and was found to contain about 8 to 10% by weight of unreacted phenylthionophosphonoyl dichloride. An additional mixture of methanol (3.2 lbs.), trimethylamine (5.9 lbs.) and toluene (10 gallons) was then added with stirring to the reaction mixture.

After this time the entire reaction mixture was added to a solution of 4-bromo-2,5-dichlorophenol (500 lbs.) in toluene (165 gallons) which was contained in a 500 gallon glass-lined reactor, and which had first been refluxed for a period of about two hours to remove any water present, and then cooled to about 40° F. The reactor was sealed and liquid trimethylamine (118 lbs.) were added over a period of one hour. A sample of the reaction mixture was then analyzed for the presence of unreacted intermediate. The analysis showed some remaining intermediate, therefore additional 4-bromo-2,5-dichlorophenol (35 lbs.) and trimethylamine (7 lbs.) was added. After the reaction was completed the reaction mixture was washed, first with an aqueous solution of sulfuric acid (3 gallons of concentrated acid in 200 gallons of water), then twice with water, and twice with a solution of sodium bicarbonate (50 lbs.) in water (200 gallons), and finally with 200 gallons of water. After the washing was completed and the aqueous phase was removed from the reaction mixture the toluene was stripped from the mixture by steam distillation leaving the desired O-methyl-O-4-bromo-2,5-dichlorophenyl phenylthionophosphonate product.

While the present invention is described in terms of batch process, it is not limited thereto since a continuous operation for the described process is readily apparent to those skilled in the art.

I claim:

1. A process for preparing an O-alkyl-O-phenyl phenyl-thionophosphonate which comprises
    (a) reacting an unsubstituted, methyl, chloro or nitro-substituted phenylthionophosphonoyl dichloride or dibromide with a substantially stoichiometric quantity of an alkanol containing from 1 to about 5 carbon atoms in the presence of a substantially stoichiometric quantity of trimethylamine in an aromatic hydrocarbon solvent medium at a temperature of from about −20° C. to about 35° C. and,
    (b) reacting the resulting intermediate reaction mixture with at least about the stoichiometric quantity of a phenol in the presence of a substantially stoichiometric quantity of trimethylamine in an aromatic hydrocarbon solvent medium at a temperature from about 0° C. to about 35° C., and thereafter recovering the product.

2. The process of claim 1 wherein O-methyl-O-4-bromo-2,5-dichlorophenyl phenylthionophosphonate is prepared by reacting phenylthionophosphonoyl dichloride with methyl alcohol and thereafter reacting the intermediate mixture with 4-bromo-2,5-dichlorophenol.

3. The process of claim 1 wherein the aromatic hydrocarbon solvent is toluene.

4. The process of claim 1 wherein the phenylthionophosphonoyl dihalide, the alkanol, and the phenol are reacted in substantially stoichiometric proportions.

5. The process of claim 1 wherein O-methyl-O-4-bromo-2,5-dichlorophenyl phenylthionophosphonate is prepared by (a) reacting substantially equimolar proportions of phenylthionophosphonoyl dichloride and methyl alcohol in the presence of trimethylamine at a temperature of from about −20° C. to about 35° C. and,
(b) reacting the resulting intermediate reaction mixture with an equimolar proportion of 4-bromo-2,3-dichlorophenol in relation to the phenylthionophosphonoyl dichloride in the presence of at least equimolar proportion of trimethylamine at a temperature from about 0° C. to about 35° C. and thereafter recovering the product.

References Cited
UNITED STATES PATENTS 3,149,143  12/1959  Newallis et al. _____ 260—973X
3,327,026  6/1967  Shindo et al. _____ 260—973

CHARLES B. PARKER, Primary Examiner

D. R. PHILLIPS, Assistant Examiner